US008303706B2

(12) United States Patent
Reddy

(10) Patent No.: US 8,303,706 B2
(45) Date of Patent: Nov. 6, 2012

(54) YELLOW INORGANIC PIGMENT FROM SAMARIUM AND MOLYBDENUM COMPOUNDS AND A PROCESS FOR PREPARING THE SAME

(75) Inventor: Mundlapudi Lakshmipathi Reddy, Thiruvananthapuram (IN)

(73) Assignee: Council of Scientific & Industrial Research, New Delhi (IN)

( * ) Notice: Subject to any disclaimer, the term of this patent is extended or adjusted under 35 U.S.C. 154(b) by 0 days.

(21) Appl. No.: 13/260,423

(22) PCT Filed: Sep. 30, 2009

(86) PCT No.: PCT/IN2009/000541
§ 371 (c)(1),
(2), (4) Date: Oct. 13, 2011

(87) PCT Pub. No.: WO2010/109473
PCT Pub. Date: Sep. 30, 2010

(65) Prior Publication Data
US 2012/0017807 A1    Jan. 26, 2012

(30) Foreign Application Priority Data

Mar. 27, 2009 (IN) .............................. 601/DEL/2009

(51) Int. Cl.
*C01G 39/00* (2006.01)
*C09C 1/00* (2006.01)
*C09C 3/00* (2006.01)

(52) U.S. Cl. ......... 106/479; 423/263; 423/606; 524/403
(58) Field of Classification Search .................. 106/479; 423/263, 606; 524/403
See application file for complete search history.

(56) References Cited

U.S. PATENT DOCUMENTS

| | | | |
|---|---|---|---|
| 2,992,123 | A | 7/1961 | Seabright |
| 3,300,848 | A * | 1/1967 | Leitten, Jr et al. ............... 419/20 |
| 5,275,649 | A | 1/1994 | Linke et al. |
| 5,316,570 | A | 5/1994 | Blonski |
| 5,560,772 | A | 10/1996 | Huguenin et al. |
| 5,693,102 | A | 12/1997 | Jansen et al. |
| 6,419,735 | B1 | 7/2002 | Busnot et al. |
| 2008/0247933 | A1 | 10/2008 | Rao et al. |

FOREIGN PATENT DOCUMENTS

| | | |
|---|---|---|
| DE | 1 211 137 B | 2/1966 |
| DE | 1211137 B * | 2/1966 |
| JP | 3-954837 B2 | 8/2007 |
| WO | 98/00367 A1 | 1/1998 |

OTHER PUBLICATIONS

Fournier, Jean et al "Systems La2O3-MoO3 and Y2O3 and of the Ln6MoO12 phases", Bulletin De La Societe Chimique De France vol. 12, pp. 4277-4283 (1970).*
Kerner-Czeskleba "Phase Equilibria and Compound Formation in Rare Earth Molybdenum Oxide Systems, Ln2O3-MoO2-MoO3", Chemisty and Uses of Molybdenum, Proc. Int. Conf. 3$^{rd}$ pp. 137-142 (Aug. 19-23, 1979).*
Jean P. Fournier, et al; "Systems La2O3-MoO3 and Y2O3-MoO3 and of the Ln6MoO12 phases", Bulletin De La Societe Chimique De France, vol. 12, 1970, pp. 4277-4283; XP009127636; p. 4281.
H. Kerner-Czeskleba; "Phase equilibria and compound formation in rare earth-molybdenum-oxide systems, Ln2O3-MoO2-MoO3", Chem. Uses Molybdenum, Proc. Int. Conf., 3rd, Aug. 19-23, 1979, pp. 137-142, XP009127637 p. 137 Experimental Section Section "Materials" p. 139 Section "Compounds Ln6MoO12".
Colloidal Dynamics; "Preparing a Stable Aqueous Suspension from a Powder", 7 pages www.colloidal-dynamics.com/.../Preparing_suspension_from_powder ; (No date found for paper).
International Search Report: mailed Jan. 26, 2010; PCT/IN2009/000541.

* cited by examiner

*Primary Examiner* — Anthony J Green
(74) *Attorney, Agent, or Firm* — Ladas & Parry LLP

(57) ABSTRACT

The present invention provides a non-toxic yellow inorganic pigment consist of samarium and molybdenum oxides which may be used as additives to plastics, glasses, ceramics and paints. The samarium molybdenum yellow pigment preferably comprise $Sm_6MoO_{12}$ having a cubic crystal structure. Inorganic pigments according to the invention are formed by mixing stoichiometric amounts of $(NH_4)_6Mo_7O_{24}\cdot 4H_2O$ and $Sm_2O_3$; ball milled and calcined 1500-1650 C for 10-12 h in air atmosphere. The well ground calcined powders were used for characterization of the pigments. The phase purity and optical properties of the prepared pigments were investigated. A further aspect of the present invention is to provide of colouring a substrate. The method includes the steps of providing a substrate, and adding a samarium molybdate yellow pigment to the substrate. The samarium molybdate yellow pigment may be dispersed in the substrate or coated on the substrate.

6 Claims, 2 Drawing Sheets

US 8,303,706 B2

YELLOW INORGANIC PIGMENT FROM SAMARIUM AND MOLYBDENUM COMPOUNDS AND A PROCESS FOR PREPARING THE SAME

FIELD OF THE INVENTION

The present invention relates to a novel yellow inorganic pigment from samarium and molybdenum compound and a process for preparing the same. The present invention particularly relates to a process for preparing a yellow inorganic pigment based on the oxides of samarium and molybdenum. The novel compound exhibits a very good chromatic characteristics, in particular a remarkable yellow colour and is non-toxic.

BACKGROUND OF INVENTION

Inorganic pigments/colorants are currently widely used in many industries, especially in those of paints, inks, plastics, rubbers, ceramics, enamels, and glasses. These pigments may impart colouristic properties, and protect the coating from the effects of visible as well as ultraviolet and infrared light. For such applications, their properties like chemical and thermal stability, dispersibility, chromaticity, tint strength and covering or masking power are particularly important criteria to be taken into account in the selection of a suitable pigment.

Yellow is particularly important colour in the ceramic pigment field and the consumption of the yellow exceeds that of any other coloured pigments. There are three important yellow pigment families: tin vanadia yellows (References may be made to DCMA 11-22-4), praseodymium zircon (DCMA 14-43-4), zircon vanadia yellow (References may be made to DCMA 1-01-4). Other yellow ceramic pigments commonly used such as $Pb_2Sb_2O_7$, $PbCrO_4$, CdS are now being expelled from the market because of their toxicity (References may be made to J. A. Badenes, M. Llusar, M. A. Tena, J. Calbo, G. Monros, J. Eur. Ceram. Soc. 2002, 22, 1981-1990).

There exist a large number of inorganic pigments formulations in the state of art, in which transition metals have been employed as chromophores. In contrast, rare earths are quite sparingly used in the inorganic pigments. A notable exception is praseodymium in praseodymium zircon yellow (Dry colour Manufactures Association).

The use of praseodymium doped zirconium silicate crystals as a pigment for use in ceramic glazes was disclosed by C. A. Seabright in U.S. Pat. No. 2,992,123, July 1961. Since that time, there have been numerous patents issued for praseodymium doped zircons for ceramic applications and now it is manufactured in world wide. Stable pigment particles comprising praseodymium doped zirconium silicate particles, at least about 50 percent by volume of which range, from 0.2 to 2 µm size has been disclosed in a U.S. Pat. No. 5,316,570, May 31, 1994, which can be used for plastics and paints.

Reference may be made to U.S. Pat. No. 5,275,649 wherein, they claim a process for the preparation of environment-friendly inorganic yellow pigment based on praseodymium zircons ($ZrSiO_4$: Pr), which can be applied to ceramics because of its thermal stability. However, in the process, mineralizer sodium chloride or sodium fluoride has been employed.

Reference may be made to U.S. Pat. No. 5,560,772 wherein, they claim a non-toxic yellow/orange pigment compositions well suited for the coloration of wide variety of substrates, for example paints, varnishes, ceramics, etc. comprise a major amount of zirconium oxide and an additive amount of cerium, praseodymium and or terbium values in the form of oxides. However, this pigment preparation requires high temperature for calcinations (1700° C.).

Reference may be made to U.S. Pat. No. 5,693,102 wherein, they claim oxonitrides with a perovskite of the general formula $LnTaON_2$, where Ln is a rare-earth element, and exhibit yellow-orange to reddish brown in color with an enhanced brightness. These compounds are produced in the presence of mineralizing agent from the series of alkali metal or alkaline earth halides, by annealing a powder mixture consisting of a Ta (V) compound and a Ln compound in a reducing atmosphere of ammonia. However, drawback in the preparation of these perovskites, it is necessary to heat the starting material in the flow of toxic and inflammable ammonia gas for longer periods (20-60 hrs).

Reference may be made to U.S. Pat. No. 6,419,735, wherein they claim a process for the preparation of yellow samarium sesquisulphide pigment. The process consists of reacting samarium, trivalent rare earth metal, and alkali metal or alkaline earth metal compounds with a gaseous mixture of hydrogen sulphide and carbon disulphide. The compositions of the invention exhibit a strong yellow colour. However one of the shortcomings of this process is that it utilizes toxic gases for the synthesis of the pigment.

Reference may be made to Patent No: WO9800367 wherein, they claim yellow inorganic pigments consisting of double molybdates of cerium and of an alkali metal, of general formula, $CeM(MoO_4)_2$, in which M denotes an alkali metal, preferably sodium. The pigments disclosed in the process were synthesized by precipitation and calcination methods under nitrogen atmosphere. The crystallographic structure of the double molybdates of cerium pigment has been characterized as deformed Scheelite type and monoclinic type.

Reference may be made to Japanese Patent No. JP3954837 wherein, they claim a process for a yellow cerium pigment having a general formula: $ACe_xLn_{1-x}Mo_2O_8$ wherein x ranges from 0 to 1; A in the composition is at least one selected from the group consisting of Li, Na, K, Rb and Cs and Ln is at least one selected from the group consisting of Y, La, Gd and Lu.

Reference may be made to U.S. Pat. No. 2,479,330 wherein, they claim a process for the synthesis of a series of yellow inorganic pigments, comprising oxides of alkaline earth, praseodymium, and transition metals of the general formula (i) $Pr_2MoTm_xO_{6+\delta}$ (Tm=Ti or Zr and x=0 or 1) and (ii) $APr_2MoO_7$ [A=Mg, Ca, Sr or Ba], well suited for colouring applications of a wide variety of substrates for example paints, varnishes, plastics, ceramics etc.

Although some alternative yellow pigments based on cerium oxide and other transition metal oxides have been reported, but their chromatic properties are not satisfactory for industrial use (References may be made to T. Masui, H. Tategaki, N. Imanaka, J. Mater. Sci. 2004, 39, 4909-4911; Imanaka et al. Chem. Lett. 2005, 34, 1322-1323; T. Masui, S. Furukawa, and N. Imanaka, Chem. Lett. 2006, 35, 1032-1033; S. Furukawa, T. Masui, N. Imanaka, Journal of Alloys and Compounds 2008, 45, 640-643; P. Prabhakar Rao and M. L. P. Reddy, Dyes and Pigments, 2004, 63, 169-174; Giable George, L. Sandhya Kumari, V. S. Vishnu, S. Ananthakumar and M. L. P. Reddy, J. Solid State Chem. 2008, 181, 487-492).

Unfortunately, the inorganic pigments which are suitable for the above applications and which are in use today on an industrial scale, generally comprise of metals like cadmium, lead, chromium, cobalt etc, the use of which is becoming strictly controlled and are even prohibited, by legislation in many countries, due to their high toxicity. Thus, serious need arises to design environment friendly inorganic yellow pigments devoid of the above cited disadvantages and drawbacks.

Thus the novelty of the present invention is to provide a non-toxic yellow inorganic pigment based on mixed oxides of samarium and molybdenum compounds.

OBJECTIVES OF THE INVENTION

The main object of the present invention is thus to provide a novel yellow inorganic pigment based on mixed oxides of samarium and molybdenum compounds having the formula $Sm_6MoO_{12}$.

Another object of the present invention is to provide a non-toxic yellow inorganic pigment as alternative to the existing toxic yellow pigments, so as they are environmental benign.

Yet another object of the present invention is to provide a yellow pigment which is commercially viable and obviates the limitations of the Pigment Industry.

Still another object of the present invention is to provide colorants that can be used to form coloured objects or coatings through their use in applications such as paints, plastics, glasses, ceramics etc.

SUMMARY OF THE INVENTION

Accordingly, the present invention provides a yellow inorganic pigment comprising oxides of samarium and molybdenum wherein said yellow inorganic pigment obtained has a formula $Sm_6MoO_{12}$.

In an embodiment of the present invention the yellow pigment of formula $Sm_6MoO_{12}$ has chromaticity coordinates as per the CIE 1976 colour scales are L*(lightness)=86.67, a*(the axis red green)=−3.40, b*(the axis yellow blue) =64.67.

In another embodiment of the present invention the particle size of the yellow pigment of formula $Sm_6MoO_{12}$ is in the range of 9.55 µm to 12.72 µm.

In yet another embodiment of the present invention the yellow pigment of formula $Sm_6MoO_{12}$ comprises of a cubic fluorite crystal structure.

In yet another embodiment of the present invention a process for the preparation of a yellow inorganic pigment comprising the steps of mixing the solid solutions of the samarium and molybdenum oxides in the stoichiometric ratios, calcinating at a temperature in the range of 1500° C. -1650° C. in air atmosphere for a period of about 6-12 hrs.

Still in another embodiment of the present invention a process for colouring a material, comprising the step of adding to said material a colouring amount of a yellow inorganic pigment in an amount in the range of 5% to 10% by weight.

In another embodiment of the invention material is selected from the group of organic polymers such as plastics, glasses, ceramics, paints etc.

DETAILED DESCRIPTION OF THE INVENTION

Figure 1:
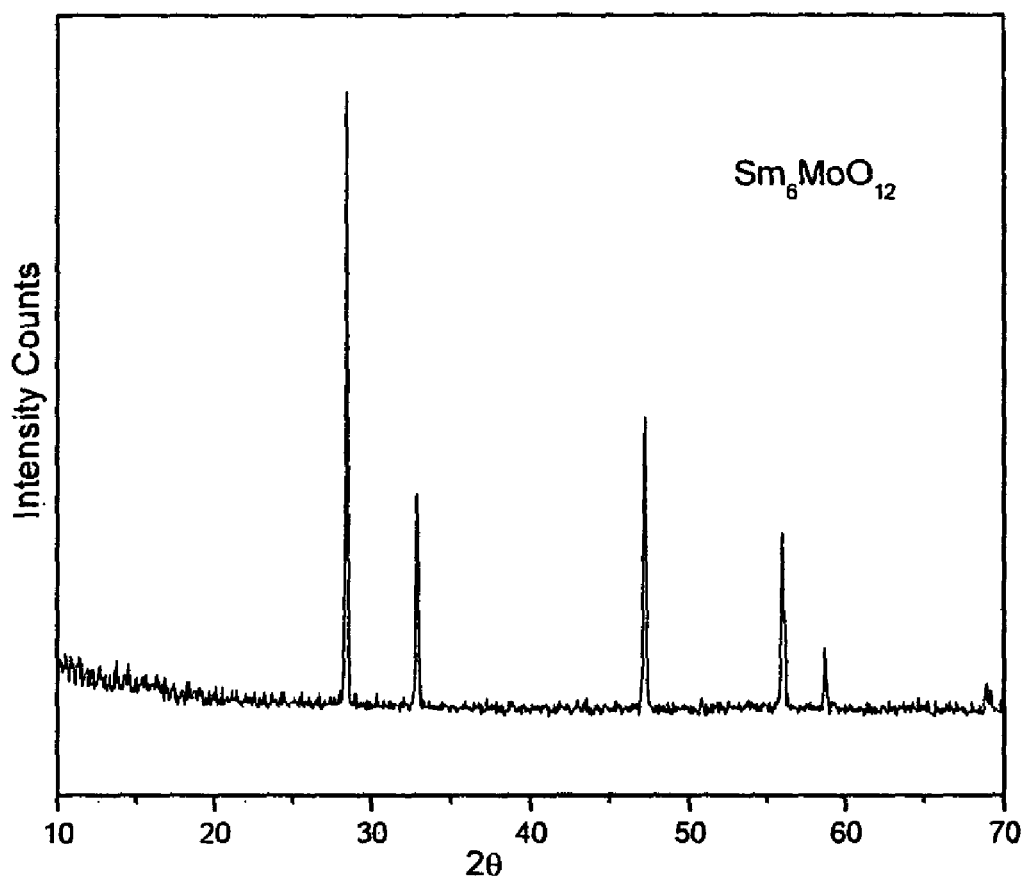
FIG. 1. Powder X-ray diffraction pattern of $Sm_6MoO_{12}$.

The samarium molybdenum yellow pigments having formula $Sm_6MoO_{12}$ comprising of a cubic crystal structure. Inorganic pigment according to the invention are formed by mixing stoichiometric amounts of high purity $(NH_4)_6Mo_7O_{24}.4H_2O$ and $Sm_2O_3$; ball milled and calcined at a temperature in the range of 1500-1650° C. for 10-12 hrs in air. The well ground calcined powders were used for the characterization of pigments. The particle size distribution of the pigment, $Sm_6MoO_{12}$ was investigated in water as a medium and Calgon™(sodium hexametaphosphate) as the dispersing agent measured by the laser scattering particle size distribution analyser (CILAS 930 Liquid). The results show a distribution with 90% of the particles being smaller than 28.63 µm, 50% smaller than 9.55 µm and 10% smaller than 1.25 µm. The mean particle diameter of the pigment sample was found to be 12.72 µm.

The phase purity and optical properties of the prepared pigments were investigated. Thermogravimetric analysis of the typical pigment $Sm_6MoO_{12}$ was carried out in the range of 50-1000° C. using Pyris Diamond TG/DTA Perkin Elmer make. It is clear from the thermogram that the pigment is thermally stable up to 1000° C. The typical pigment $Sm_6MoO_{12}$ was tested for its acid and alkali resistance. A pre-weighed quantity of the pigment was treated with 3% $HCl/H_2SO_4/HNO_3$ and NaOH, and soaked for half an hour with constant stirring using a magnetic stirrer. The pigments were then filtered, washed with water, dried and weighed. No weight loss was noticed for all the acids and alkali tested. The typical L* a* b* values after acid and alkali resistance tests were found to be (L*=85.13; a*=−3.13; b*=65.06 and L*=85.09; a*=−3.13; b*=64.10 for HCl and NaOH, respectively) same as that of pigment powder sample. Thus the designed yellow pigments are found to be chemically and thermally stable.

A further aspect of the present invention is to provide colouring to a substrate (like plastics, polymers etc.). The method includes the steps of providing a substrate, and adding a samarium molybdate yellow pigment to the substrate. The samarium molybdate yellow pigment may be dispersed in the substrate or coated on the substrate. Thermogravimetric analysis of the pigmented polymer sample was carried out in the range of 50-500° C. The thermogravimetric analysis clearly indicates the thermally stability of the coloured polymer up to 225° C. The light resistance of the above $Sm_6MoO_{12}$ dispersed PMMA matrix was tested by exposing it to sunlight at various time intervals and measured the colour coordinates. The L* a* b* values (L*=68.24; a*=−3.28; b*=64.10 after 24 h; L*=67.85; a*=−3.47; b*=64.18 after 48 h; L*=68.05; a*=−3.49; b*=65.89 after 72 h) were same as that of the unexposed sample. This indicates that the pigmented polymer is light resistant. Thus the developed pigments may find potential applications in colouring of various plastic materials as well as coatings.

The following examples are given by way of illustration and therefore should not be construed to limit the scope of the present invention

EXAMPLE 1

Figure 2:
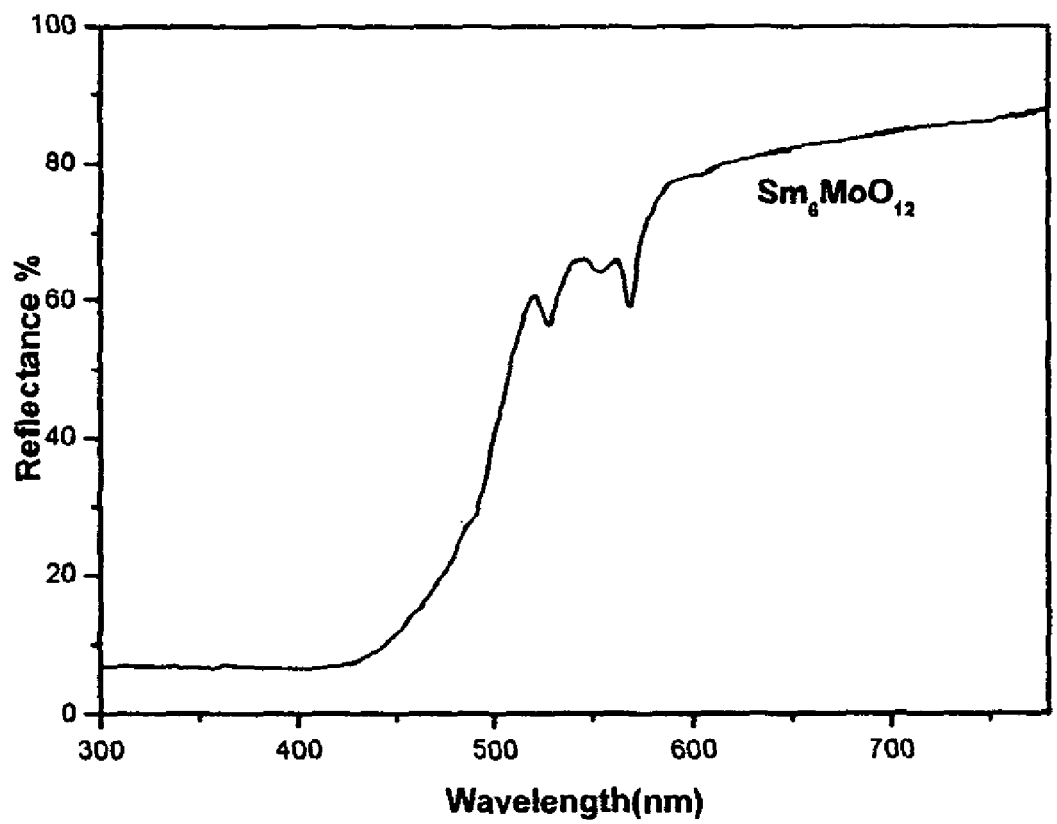
FIG. 2. Diffuse reflectance spectra of $Sm_6MoO_{12}$.

Preparation of $Sm_6MoO_{12}$ colorant/pigment—$Sm_2O_3$ and $(NH_4)_6Mo_7O_{24}.4H_2O$ were thoroughly mixed in the stoichiometric ratio in agate mortar with a pestle. The mixture was calcined at 1650° C. for 12 h in air atmosphere. The calcined mass was then grinded with mortar and pestle to reduce the particle size of the pigment. The obtained powders were examined by means of X-ray powder diffraction (XRD) using Ni filtered CuKα1 radiation with a Philips X'pert Pro diffractometer. The XRD patterns can be indexed to cubic fluorite phase as depicted in FIG. 1. The sharp and intense peaks reveal the crystalline nature of the pigment. Optical reflectance of the powder was measured with UV-vis spectrophotometer (Shimadzu, UV-2450) using barium sulphate as a reference and is shown in FIG. 2. The optical absorption edge critically depends on the concentration of molybdenum present in the pigment samples and it absorbs blue light efficiently, which is originated from the $O_{2p}$-$Mo_{3d}$ charge transitions. As a result, the colour of the pigment samples becomes yellow because blue is a complimentary colour to yellow. The chromaticity coordinates, determined by the CIE-LAB 1976 color scales are $L^*$=86.67, $a^*$=−3.40, $b^*$=64.67. The values $a^*$ (the axis red-green) and $b^*$ (the axis yellow-blue) indicate the color hue. The value $L^*$ represents the lightness or darkness of the color as related to a neutral grey scale.

The phase purity and optical properties of the prepared pigments were investigated. Thermogravimetric analysis of the typical pigment $Sm_6MoO_{12}$ was carried out in the range of 50-1000° C. using Pyris Diamond TG/DTA Perkin Elmer make. It is clear from the thermogram that the pigment is thermally stable up to 1000° C. The typical pigment $Sm_6MoO_{12}$ was tested for its acid and alkali resistance. A pre-weighed quantity of the pigment was treated with 3% $HCl/H_2SO_4/HNO_3$ and NaOH, and soaked for half an hour with constant stirring using a magnetic stirrer. The pigments were then filtered, washed with water, dried and weighed. No weight loss was noticed for all the acids and alkali tested. The typical $L^*$ $a^*$ $b^*$ values after acid and alkali resistance tests were found to be ($L^*$=85.13; $a^*$=−3.13; $b^*$=65.06 and $L^*$=85.09; $a^*$=−3.13; $b^*$=64.10 for HCl and NaOH, respectively) same as that of pigment powder sample. Thus the designed yellow pigments are found to be chemically and thermally stable.

EXAMPLE 2

Preparation of $Sm_6MoO_{12}$ colorant/pigment—$Sm_2O_3$ and $(NH_4)_6Mo_7O_{24}.4H_2O$ were thoroughly mixed in the stoichiometric ratio in agate mortar with a pestle. The mixture was calcined at 1650° C. for 10 h in air atmosphere. The calcined mass was then grinded with mortar and pestle to reduce the particle size of the pigment. The XRD patterns can be indexed to cubic fluorite phase. The sharp and intense peaks reveal the crystalline nature of the pigment. Optical reflectance of the powder was measured with UV-vis spectrophotometer (Shimadzu, UV-2450) using barium sulphate as a reference. The optical absorption edge critically depends on the concentration of molybdenum present in the pigment samples and it absorbs blue light efficiently, which is originated from the $O_{2p}Mo_{3d}$ charge transitions. As a result, the colour of the pigment samples becomes yellow because blue is a complimentary colour to yellow. The chromaticity coordinates, determined by the CIE-LAB 1976 color scales are $L^*$=83.34, $a^*$=−5.33, $b^*$=64.21.

EXAMPLE 3

Preparation of $Sm_6MoO_{12}$ colorant/pigment—$Sm_2O_3$ and $(NH_4)_6Mo_7O_{24}.4H_2O$ were thoroughly mixed in the stoichiometric ratio in agate mortar with a pestle. The mixture was calcined at 1500° C. for 10 h in air atmosphere. The calcined mass was then grinded with mortar and pestle to reduce the particle size of the pigment. The obtained powders were examined by means of X-ray powder diffraction (XRD) using Ni filtered CuKα radiation with a Philips X'pert Pro diffractometer. The XRD patterns can be indexed to cubic fluorite phase. The chromaticity coordinates, determined by the CIE-LAB 1976 color scales are $L^*$=82.15, $a^*$=−7.10, $b^*$=47.19. The values $a^*$ (the axis red-green) and $b^*$ (the axis yellow-blue) indicate the color hue. The value $L^*$ represents the lightness or darkness of the color as related to a neutral grey scale.

EXAMPLE 4

Coloration of substrate material—Poly (methyl methacrylate); (PMMA; Sigma Aldrich) was utilized as a binder phase for fabricating the pigmented compact. The typical pigment sample, $Sm_6MoO_{12}$ (prepared in example 1) was ultrasonicated (Vibronics, 250 W, India) in an alcohol/water (1:4) mixture for 10 min to ensure the complete dispersion of the pigment particles. A viscous solution consists of PMMA (90 wt %) was made using a conventional electrical coil heater. The pigment dispersion (10 wt %) was slowly added while stirring and converted into a thick paste. The paste after 2 h of curing, compressed uniaxially into the form of cylindrical discs using a hydraulic press (Lawrence & Maya, India) at a pressure of 25 MPa. Both sides of the pigmented polymer were lapped using a fine grade emery sheet for obtaining a polished surface. The colour coordinates of the test piece was measured at different locations and an average value was found to be: $L^*$=67.97; $a^*$=−3.10; $b^*$=63.18. The colour hue values obtained are more or less the same, indicating the uniform distribution of the pigment particles in the polymer matrix. The intensity of the colour of the plastic depends on the concentration of the pigment being incorporated.

Thermogravimetric analysis of the pigmented polymer sample was carried out in the range of 50-500° C. The thermogravimetric analysis clearly indicates the thermally stability of the coloured polymer up to 225° C. The light resistance of the above $Sm_6MoO_{12}$ dispersed PMMA matrix was tested by exposing it to sunlight at various time intervals and measured the colour coordinates. The $L^*$ $a^*$ $b^*$ values ($L^*$=68.24; $a^*$=−3.28; $b^*$=64.10 after 24 h; $L^*$=67.85; $a^*$=−3.47; $b^*$=64.18 after 48 h; $L^*$=68.05; $a^*$=−3.49; $b^*$=65.89 after 72 h) were same as that of the unexposed sample. This indicates that the pigmented polymer is light resistant. Thus the developed pigments may find potential applications in colouring of various plastic materials as well as coatings.

EXAMPLE 5

Coloration of substrate material—Poly (methyl methacrylate); (PMMA; Sigma Aldrich) was utilized as a binder phase for fabricating the pigmented compact. The typical pigment sample, $Sm_6MoO_{12}$ (prepared in example 1) was ultrasonicated (Vibronics, 250 W, India) in an alcohol/water (1:4) mixture for 10 min to ensure the complete dispersion of the pigment particles. A viscous solution consists of PMMA (95 wt %) was made using a conventional electrical coil heater. The pigment dispersion (5 wt %) was slowly added while stirring and converted into a thick paste. The paste after 2 h of curing, compressed uniaxially into the form of cylindrical discs using a hydraulic press (Lawrence & Maya, India) at a pressure of 25 MPa. Both sides of the pigmented polymer were lapped using a fine grade emery sheet for obtaining a polished surface. The colour coordinates of the test piece was measured at different locations and an average value was found to be : $L^*$=71.60; $a^*$=−4.27; $b^*$=45.78. The colour hue values obtained are more or less the same, indicating the uniform distribution of the pigment particles in the polymer matrix.

I claim:

1. A yellow inorganic pigment comprising samarium molybdate ($Sm_6MoO_{12}$) having chromacity coordinates as defined by a CIE 1976 colour scale of $L^*$=86.67, $a^*$=−3.40, and b*=64.67 obtained from a solid solution of $Sm_2O_3$ [samarium(III) oxide] and $(NH_4)6Mo_7O_{24}.4H_2O$ [Ammonium molybdate(VI) tetrahydrate] after ball milling in a stoichiometric ratio and calcining at temperature in the range of 1600° C.-1650° C. in an air atmosphere for a period of about 10-12 hrs, wherein a particle size of said pigment is in a range of 9.55 μm to 12.72 μm.

2. A process for colouring a material, comprising the step of adding to said material a colouring amount of a yellow inorganic pigment as defined in claim 1 in an amount in the range of 5% to 10% by weight.

3. The process as claimed in claim 2, wherein the material is selected from the group consisting of plastics, glasses, ceramics, and paints.

4. A yellow inorganic pigment comprising samarium molybdate having chromacity coordinates as defined by a CIE 1976 colour scale of L*=82.15, a*=−7.10, and b*=47.19 obtained from a solid solution of $Sm_2O_3$ [samarium(III) oxide] and $(NH_4)_6Mo_7O_{24}.4H_2O$ [Ammonium molybdate (VI) tetrahydrate] after mixing in a stoichiometric ratio and calcining at a temperature of 1500° C. for 10 hrs in an air atmosphere, wherein a particle size of said pigment is in a range of 9.55 μm to 12.72 μm.

5. A process for colouring a material, comprising the step of adding to said material a colouring amount of a yellow inorganic pigment as defined in claim 4 in an amount in the range of 5% to 10% by weight.

6. The process as claimed in claim 5, wherein the material is selected from the group consisting of plastics, glasses, ceramics, and paints.

* * * * *